June 24, 1941.    A. F. SHIELDS    2,246,957
CONTINUOUS ROTARY SHEARING MECHANISM
Filed Feb. 20, 1939    4 Sheets-Sheet 1

INVENTOR.
Albert F. Shields
BY Ostrolenk & Greene
ATTORNEYS

June 24, 1941.　　　A. F. SHIELDS　　　2,246,957

CONTINUOUS ROTARY SHEARING MECHANISM

Filed Feb. 20, 1939　　　4 Sheets-Sheet 4

INVENTOR.
Albert F. Shields
BY
Ostrolenk & Greene
ATTORNEYS

Patented June 24, 1941

2,246,957

UNITED STATES PATENT OFFICE 2,246,957

CONTINUOUS ROTARY SHEARING MECHANISM

Albert F. Shields, Jamaica, N. Y., assignor to S. & S. Corrugated Paper Machinery Co., Inc., Brooklyn, N. Y., a corporation of New York Application February 20, 1939, Serial No. 257,471

23 Claims. (Cl. 164—66)

This invention relates to cutting mechanisms and more particularly relates to rotary shearing devices which cut transversely across a continuously moving web.

In prior rotary shearing devices, the construction of the blades were rather involved and required expensive design and adjustment in practice. In one form of rotary knives, the blades were arranged in a helix about the drum and produced a pinch cut on the web. This necessitated building up the blade in a plurality of small complex sections.

In another prior construction the blades were designed to cut from one end of the drum to the other and the drums bearing the blades were advanced at an angle with respect to the transverse position across the web in order to compensate for the movement of the web during cutting.

The most desirable form of severance of a sheet from a moving web is with a pure shearing action. It has been recognized that a rotary shearing arrangement is more suitable than a reciprocating mechanism since less shock and vibration attend the cutting and shorter sheets can be cut with the rotary devices as well as operation at a faster speed.

I have discovered that a smooth shearing action can be effected transversely of a moving web with a rotary blade arrangement constructed of original flat simple edged blades mounted with no advanced or retarded drum angular position. The blades of my present invention produce a rapid smooth clean shearing on the web. They are mounted in an off-radial position with respect to their drums and arranged in a space-curvature on the drum. The flat blades are sufficiently flexible for adjustment into the preferred space curvature to be described which permits continuous rotary shearing by the blades without interference or buckling.

In accordance with my present invention, I contemplate a cutting procedure which I shall term the symmetrical cut. One set of blades such as the upper set is arranged in the form of a V being tapered from the outside edges towards the center. The cutting proceeds from the projecting tips of the V simultaneously from both outer edges of the web towards the center. The opposite coacting blade may be a linear blade corroborating with the V set or may in turn have a V or other configuration.

Another form of the invention comprises a double V formation for one set of blades which construction has inherent advantages as will be set forth hereinafter.

The symmetrical cutting action of my present invention produces a flatter, stiffer and sharper shear. The web is gripped firmly and symmetrically, insuring a positive and straight delivery action by the blade. The lower blade assembly is so arranged as to receive each separate sheet and act as a delivery mechanism for the sheet. The symmetrical action and positive straightaway delivery eliminates the necessity for an auxiliary delivery mechanism.

It is accordingly an object of my present invention to provide a novel rotary shearing mechanism constructed with flat, plane blades arranged as a V.

Another object of the invention is to provide a novel method of and means for producing a symmetrical cutting action on a moving web.

Still another object of the present invention is to provide a novel rotary shearing mechanism which grips the moving web firmly and symmetrically during shearing and serves to deliver the sheet after severance.

A further object of the present invention is to provide a novel construction rotary shearing having a V shape and space-curve into a curtate epitrochoid.

Still a further object of the present invention is to provide a rapid rotary symmetrical cutting mechanism which is not sensitive to speed adjustment.

These and further objects of my invention will become apparent from the following description taken in connection with the drawings, in which.

Figure 1:
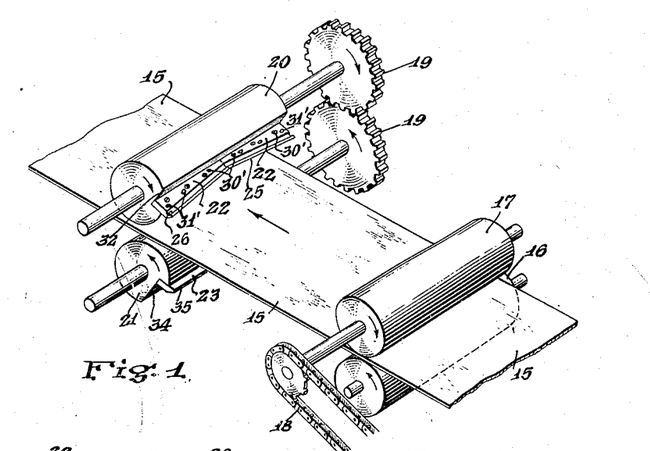
Figure 1 is a perspective view of the cut-off mechanism arranged for transversely shearing a continuously moving web.

In Figure 1 I have shown only that portion of the cutting machine containing the cut-off mechanism. The remainder of the machine is conventional and is well known in the art.

The continuous web 15 is shown being advanced through the machine from right to left. Feed rollers 16—17 motivated by drive 18 advance the sheet at a predetermined synchronous speed. The cut-off mechanism is motivated by the meshing gears 18—19 driven in turn by a driving arrangement not shown but well known in the art. Knife drums 20 and 21 are directly connected to gears 18 and 19. The upper knife drum 20 contains upper cutting blades 22, the plan view of which appears as a V. The lower knife drum 21 has secured thereto lower blade 23 which coacts with the upper blades 22.

The present invention is primarily directed to a novel and approved continuous rotary cut-off assembly. The cutting blades are designed to produce a pure transverse shearing action upon the continuously moving web 15.

The peripheral speed of the blades 22 and 23 is made substantially equal to or slightly in excess of the linear speed of the moving sheet 15 during the cutting interval of the blades. In order to compensate for adjustments whereby the cut-off mechanism shears different lengths of sheets on web 15, the cyclic speed of the knife drums 20—21 is correspondingly changed as is well known in the art. The means for driving gears 18—19 includes speed varying means which, while varying the angular velocity of the knives in between the cutting interval maintains the angular velocity thereof near the predetermined speed during the cutting interval. Such a device, for example, forms the basis of my copending application, U. S. Serial No. 191,060, filed February 17, 1938 although different variable speed driving means may be employed.

In accordance with my present invention I provide a V blade assembly arranged to produce pure transverse shearing upon the moving web while the blade assembly executes a rotary motion. The cutting proceeds simultaneously from each end of the web towards the center. This method of cutting from both ends towards the center by the V blades I shall hereinafter term a "symmetrical cut." Many advantages accrue from this method of cutting.

By such symmetrical cutting, the sheet being cut is held more firmly than in prior art methods and is delivered in its original straight path of travel after being sheared.

Another important advantage derived from the multiple cutting action from the ends towards the center is the corresponding decrease in the angle of the shearing interval. Thus the V construction illustrated in Figure 1 cutting from both ends towards the center, halves the cutting angle required by prior art constructions for the same shearing angle of the blade.

The blade assembly for the symmetrical cutting consists of straight simple blades, requiring no special shapes or forms. The simple blades are readily constructed, adjusted and serviced.

Figures 2, 3, 4:
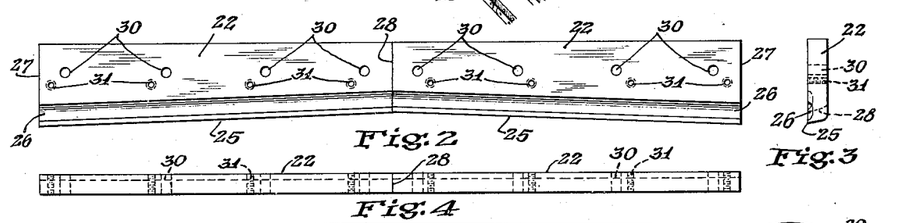
Figure 2 is a plan view of the upper blade having a V appearance, constituting one form of the invention.
Figure 3 is an end view of the upper blade assembly of Figure 2.
Figure 4 is an elevational view thereof.

Figure 2 is a plan view of the upper V blade assembly 22. The blades are simple to manufacture, being flat and having a simple tapered cutting edge 25. A clearance or relief 26 is formed adjacent the shearing edge 25. The taper of the blade is small. Thus for example, a blade section 39" long and 3.0" wide at the outer edge 27 in one case, was tapered so that the inner edge 28, located at the center of the assembly, was 2.5" wide.

The blade assembly 22—22 is symmetrical, being formed of equally sized units placed end to end. The shearing edge of the assembly as shown in Figure 2 is in the form of a V. The blades contain cap screw holes 30 and threaded holes 31 for set screw adjustments to be described. Figure 3 is an end view of the upper blades 22 and Figure 4 is an elevational view thereof.

Figure 5:
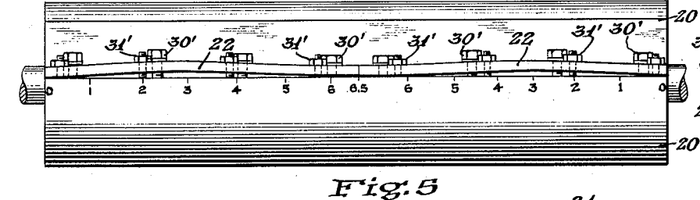
Figure 5 is an elevational view of the upper blade assembly mounted upon the knife drum and adjusted for the cutting operation.
Figure 6:
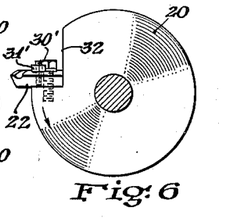
Figure 6 is an end view corresponding to the upper mounted V blade assembly of Figure 5.

Figure 5 is an elevational view of the upper blade assembly mounted in position upon the knife drum 20, and Figure 6 is an end view thereof. Cap screws 30' are used to secure the blades 22 onto drum 20 in the conventional manner. Set screws 31' operate in threaded holes 31 and are used to adjust the curvature of the blades 22 with respect to the adjacent surface of drum 20 in a manner to be described. The blades 22 are mounted in a recess 32 in drum 20 as is evident from the end view, Figure 6.

The curvature of blade 22 as viewed from the front when ready for service forms an important feature of the present invention. The blades are arranged to provide a purely shearing action transversely of the continuously moving web. At this point it is sufficient to say that the space curvature of each of the blades 22 is a curtate epitrochoid. The method of obtaining the desired curvature and the considerations entering into the design and angular positioning of the blades will be dealt with in more detail hereinafter.

Figures 7, 8, 9, 10:
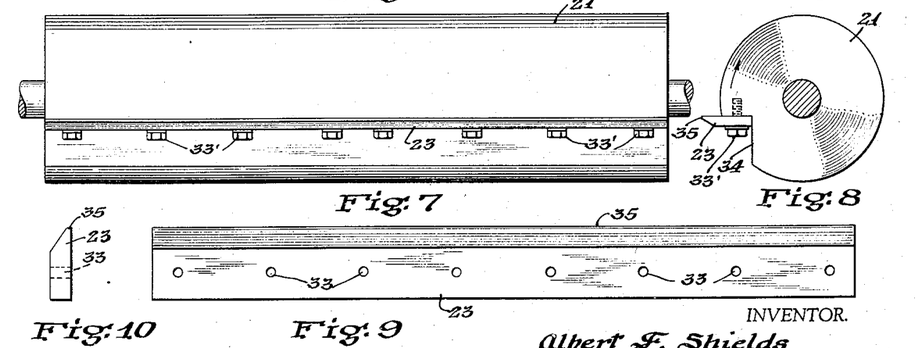
Figure 7 is a front view of the lower blade mounted upon the corresponding knife drum.
Figure 8 is an end view of the mounted lower blade assembly of Figure 7.
Figure 9 is a plan view of the lower blade.
Figure 10 is an end view thereof.

Figure 7 is an elevational view of the lower knife drum 21 with the lower shearing blade 23 secured thereto by cap screws 33'. Blade 23 is mounted in a recess 34 of drum 21 as seen in the end view thereof, Figure 8.

Figure 9 is a plan view of the lower blade 23 and Figure 10 is an end view thereof. Blade 23 is a simple rectangular straight-edged blade having a shearing edge 35. Regularly spaced holes 33 are provided for the cap screw 33'.

Figure 11:
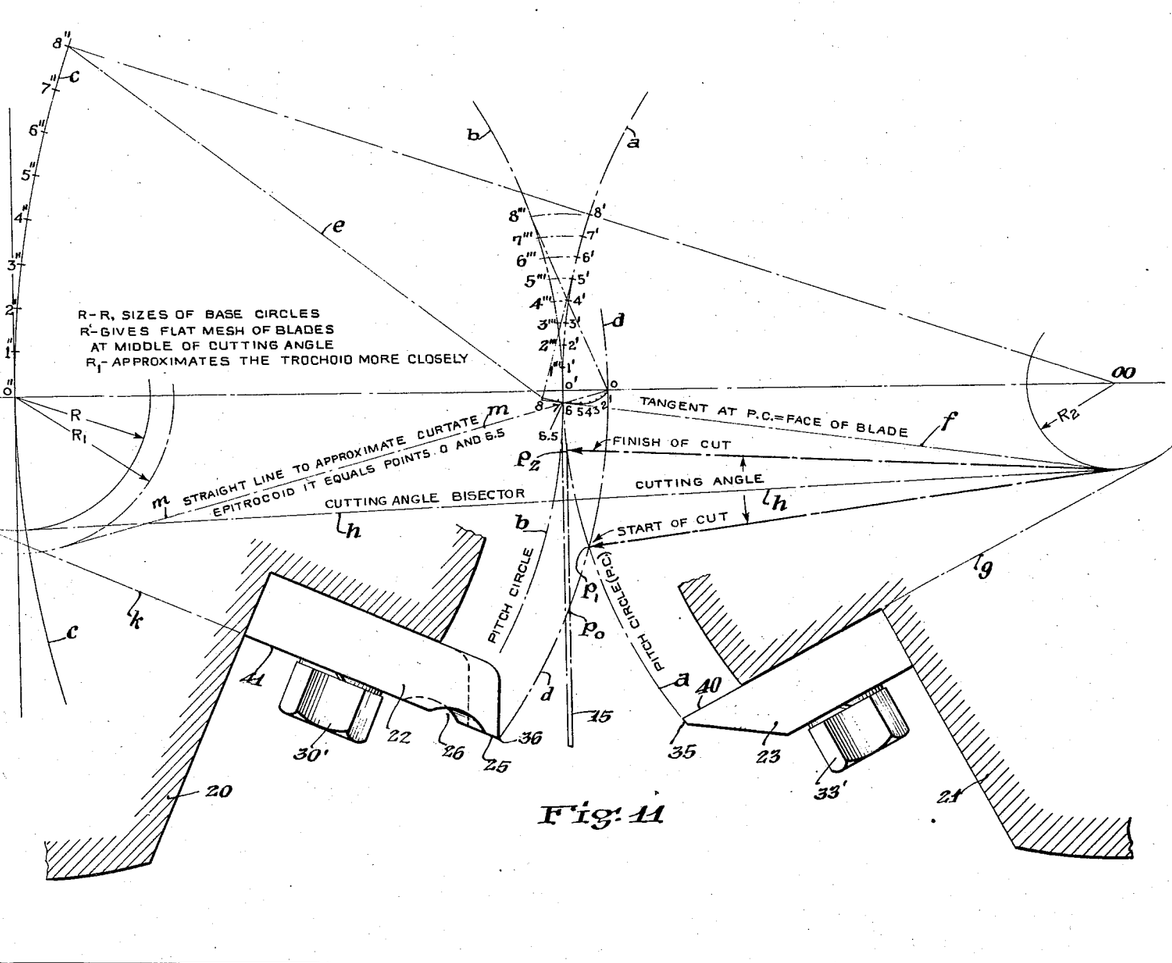
Figure 11 is a working diagram employed in the design of the knife structure in accordance with the present invention.

The angular position of the upper and lower blades 22 and 23 on their respective drums 20 and 21 is off-radial with respect to the drums. Design considerations entering into the preferred angular determinations for the blades are set forth in the diagram constituting Figure 11. Figure 11 also sets forth the physical cooperation between the shearing edges of the cutting blades and outlines the formation of the curtate epitrochoid curve which the upper or V blade construction assumes with respect to the drum as shown in Figure 5.

The end view of blade 22 as seen in Figure 11 is flat upon drum 20. It is to be understood however that after the upper blades are adjusted for cutting in a manner to be described they assume a space curve and appear as shown and described in connection with Figures 5 and 6.

In the illustrated arrangement of the blades in Figure 11, the shearing edge 35 of lower blade 23 is positioned to coincide with the pitch circle a—a of the lower assembly. The shearing edge 25 of upper blade 22 projects substantially beyond the pitch circle b—b of the upper drum 20. The tip 36 of blade 22 is the furthest projecting element thereof.

In tracing out the relative motion between shearing edges 25 and 35 as the knife drums 20 and 21 rotate with respect to each other it is simpler to assume one drum stationary and the other rolling along the pitch circles. Figure 11 has been constructed in this manner, considering lower drum 21 fixed in position and upper drum 20 rolling along pitch circle a—a starting from the point of tangency 0'. In this case the center 0" of drum 20 executes the circular arc c—c having a radius equal to the combined radii of drums 20 and 21 and a center 00.

Starting at point 0' where pitch circles a and b are tangent, pitch circle b is treated as being progressively rotated in a clockwise direction on circle a, along points 1', 2', 3' etc. Points 0' to 8' represent equally spaced positions in the relative motion of the pitch circle b on a. Corresponding equally spaced points 0", 1", 2" etc. to 8" are indicated at the extreme left on arc c, representing the successive position of center 0" along arc c.

The dot-dash arc d—d represents the motion of tip 36 of the upper shearing edge in its normal rotary path. The position of the arc d is substantially beyond that of the upper pitch circle b. Arc d intersects the horizontal reference line at point 0. Point 0 represents the position of tip 36 of blade 22 at the instant the cutting is started by the blades. The radial position from 0" to 0 is equal to that from 0" to tip 36. Arc d—d is generated by this same radius. It is to be understood that, in generating the path of motion of tip 36, or of point 0, as the relative movement between drum 20 and 21 progresses in a manner described along points 0' to 8', the curve produced represents the relative path not the physical path which the actual blades describe. The process to be described is a geometric one by which the movement of point 0 or the corresponding tip 36 if it were in the position at 0, would take when pitch circle b is rolled upon its circle a.

The curve produced by the motion of point 0 in relative movement between the two drums is shown as curve 0 to 8. The mathematical law which the motion involves is known as the curtate epitrochoid. It is the same curve which is involved in the design of a gear tooth for a pin gear. Actually the successive points along the curtate epitrochoid from initial point 0 towards point 8 represent the actual position along the cutting edge 25 which successively come into play as drums 20 and 21 are rotated during the cutting cycle. This principle will be further described hereinafter, particularly in connection with Figure 12.

The curtate epitrochoid 0 to 8 is graphically constructed as follows: For simplifying the representation of the diagram, I shall define the method of obtaining point 8 in the curtate epitrochoid. The intermediate points 1 to 7 are obtained in a similar manner as will be understood.

Points 1''', 2''', etc. to 8'''' along pitch circle b—b correspond to points 1'—2' etc. to 8' on circle a and represent equal distances along the respective arcs. When circle b rolls on circle a the triple-primed points on circle b coincide with the single-primed points on circle a. The distance between point a''' and initial point 0 is the same as the corresponding distance between point 8' and point 8 after circle b is rolled so that point 8''' coincides with point 8'. Accordingly an arc is swung from point 8' with a radius 0—8''', falling in the vicinity of the curtate epitrochoid to be generated. Point 8 is actually located by striking another arc from circle c—c with a center at 8" thereof and a radius equal to 0"—0. This radius, represented by line e, corresponds to the distance of point 0 or point 36 on blade 22 from the center 0" of the drum 20. The arc represented by dot-dash line e intersects line 8'—8 to determine point 8 on the curtate epitrochoid.

The remaining points on the epitrochoid are determined in a similar manner. Thus point 7 is determined by striking an arc from position 7' on circle a having a radius equal to 7'''—0; and intersecting that arc by one generated with point 7" on circle c as a center with the same radius as line e, namely equal to 0"—0. Point 6 is similarly determined by striking an arc from 6' having a radius equal to 6'''—0, and intersecting this arc with one emanating from point 6" and equal to 0"—0. This is continued until point 1 is generated by striking an arc from 1' with a radius equal to 1'''—0, and intersecting this arc with one form 1" having the same 0"—0 as a radius.

The curve shown with point 0, 1, 2 etc. to 8 is mathematically termed a curtate epitrochoid. This path is that determined by point 0 as pitch circle b rolls upon pitch circle a. A similar curve is also generated by point 36 at the tip of blade 22 during this motion. The physical shape on the curve is the same but naturally its position would be adjacent that of tip 36.

In accordance with the present invention I contemplate shaping the blades 22—22, as seen in Figure 2 to 6 in the form of or closely approximating the epitrichoid curve 0—8 in order that a progressive shearing action can proceed unhindered across the moving web. The cutting contemplated occurs from the outside end of the blades towards the center thereof, namely edges 27 to 28 as seen in Figure 2.

In Figure 11, the curtate epitrochoid intersects pitch circle a—a at point 6.5 thereof. That portion of the epitrochoid between 0 and 6.5 is considered in the design of the shearing assembly. A tangent f is drawn to the epitrochoid point 6.5. A circle $R_2$ is drawn with the center 00 of drum 21 as its center and with a radius to make it tangent to line f. This circle has a radius $R_2$. Circle $R_2$ determines the off-center position of blade 23. Both blades 22 and 23 have a non-radial position. The bottom edge 40 of blade 23 when projected along line g, is made tangent to circle $R_2$.

Circular arc d intercepts pitch circle a—a at point $p_1$ which represents the position at the "start-of-cut" as marked on the heavy dot-dash line tangent to the circle $R_2$. The cutting interval progresses from point $p_1$ along pitch circle a to point $p_2$. The heavy dot-dash line labeled "finish-of-cut," tangent to $R_2$, shows the position of blade 23 then. The "cutting angle" occurs between points $p_1$ and $p_2$ as indicated in the diagram. The angular position of the "start-of-cut" and "finish-of-cut" represents the angular positions of cutting blade 23 during the shearing action.

The shearing edge 25 of upper blade 22 is designed to coact with the straight shearing edge 35 of the lower blade 23 between points $p_1$ and $p_2$. To insure a progressively shearing action from the end towards the center of the sheet, the upper blade is tapered towards the center and curved into the curtate epitrochoid as already mentioned in connection with Figures 1 to 5. The shape of the upper blade is arranged for continuous shearing coaction with the linear shearing edge 35 of the lower blade.

For a smooth, purely shearing action, the relative motion between any coacting elements of shearing edges 25 and 35 should be in a direction towards each other and as closely perpendicular to the web as practicable. To accomplish this with the least curvature or distortion on the blades I chose the "in-line" position for blades 22 and 23 to occur at the middle of the cutting angle of interval. The angle bisector $h$—$h$ is tangent to circle $R_2$ and bisects the "cutting angle." The base circle R for upper drum 20 is generated by employing its center 0" as the center and a radius R which makes this circle tangent to the angle bisector line $h$—$h$. Upper blades 22 are oriented so that their face 41 which includes the shearing edge 25, represented by dot-dash line $k$, is tagent to the base circle R. This off-radial position of upper blades 22, in conjunction with the corresponding off-radial position of blade 23, will give a flat meshing of the blades at position $h$—$h$ in the center of the cutting interval. Thus deviations from the flat meshing of the blades which occurs between the start and finish of cutting is reduced to a minimum. Since in practice the cutting interval is a matter of 10° to 20° with my present invention, the actual deviations from optimum flat meshing position is very small.

A straight line $m$—$m$ drawn between points 0 and 6.5 of the curtate epitrochoid produces a corresponding circle $R_1$ shown drawn tangent thereto. If the face 41 of blade 22 is made tangent to circle $R_1$, the flat upper blade 22 would more closely approximate the curtate, epitrochoid curve. This advantage of smaller space-curving, can be balanced against that of more closely flat-meshing the blades in cutting, by choosing a base circle for the face of the blade 22 between the two positions R and $R_1$.

In the diagram of Figure 11 I have shown blade 22 tangent to the base circle R although it is to be understood that this off-radial position may advantageously be anywhere between R and $R_1$. By letting the lower blade edge extend somewhat beyond its pitch circle R, and R may be brought to coincidence. The sheet to be cut is indicated in dotted at 15 at a position tangent to both pitch circles $a$ and $b$ and passing through tangent point 0'. Due to the projection of the shearing edge of upper blade 20 beyond the pitch circle $b$, we find that the outer point 36 thereof contacts sheet 15 at point $p_0$ at a position substantially preceding the "start-of-cut" position of the blades.

In carrying out my invention, each upper blade 22 is mounted upon the upper drum 20 in the off-radial position described above and illustrated in Figures 5 and 6. The cap screws 30' and set screws 31' are employed to secure the blades in position on the drum in a manner similar to the prior art. First a rough attempt is made to curve the blades in the form of the curtate epitrochoid as viewed from the side as in Figure 5. Points 0, 1, 2, etc. to 6.5 in this figure, correspond to similar points on the curtate epitrochoid of Figure 11. Points 0 to 6.5 shown on the drum are equi-distant and represent corresponding portions of blade 22 which come into shearing action with the lower blade 23 corresponding to equal angular advances in the rotation of drum 20 during shearing.

A test cut is made upon a sheet of newsprint by manually rotating the cutting assembly. Set screws 31' along blades 22 are manipulated to curve the associated sections of the blades 22 for obtaining a clean, sharp cut across the sheet. A newsprint has a thickness of the order of six-thousandths of an inch. In preliminary adjustments a 30 point liner jute sheet which has a thickness of the order of one thirty-second of an inch is used. When the cutting on the jute liner progresses smoothly and transversely thereacross, the newsprint sheet is used for closer adjustment of the blades to the shearing position.

When manual adjustment of the upper blades through the cap-screws and set-screws is effected, to produce a sharp clean cut across a test sheet, a stiff web or the regular corrugated board is introduced and a number of sheets are cut by the machine. By then viewing the edge of a stack of cut sheets an experienced operator can very quickly determine whether the blades are properly adjusted and cutting transversely by the appearance of the edges of the pile of sheets. When a pile of cut sheets present a smooth, clean appearance which is not jagged and is rectangular, the blades are properly adjusted.

The resultant shape of the upper blades, tapered from the outside towards the center in V-form is a curtate epitrochoid as viewed from the front, such as in Figure 5. With this space curvature and blade arrangement, the shearing action is executed smoothly and uniformly across the moving web employing simple blades. Any wearing or subsequent misaligning of the blades can be readily corrected in the field, since the shape of the blades lends itself to ready sharpening and adjusting in the field.

Figure 12:
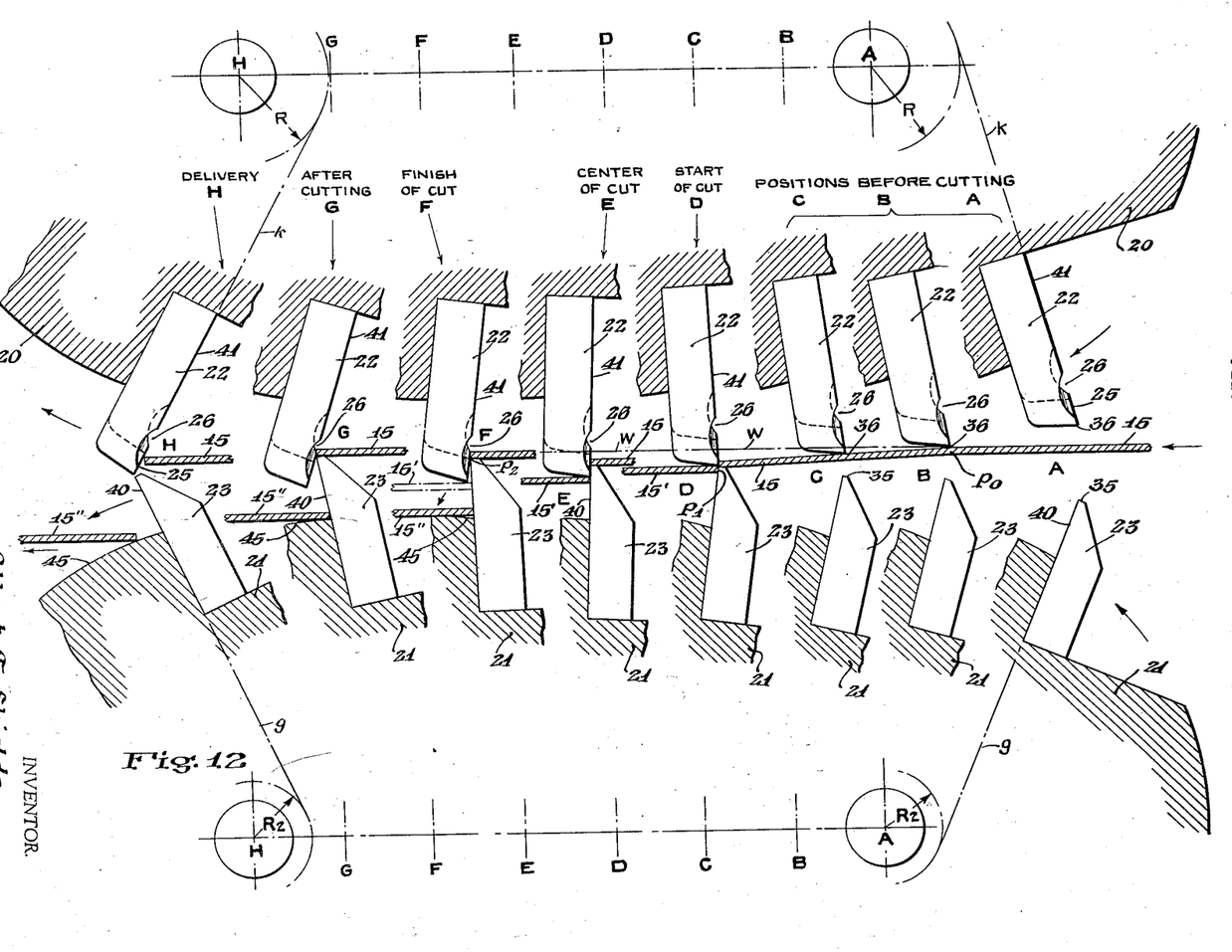
Figure 12 is a series of associated diagrammatic illustrations used in describing the operation of the shearing blades of the present invention.

In Figure 12 I have illustrated an end view of the blades in progressive positions during their cycle of operation. Upper drum 20 containing blades 22 rotates in a clockwise direction; while coacting blade 23 secured to drum 21 rotates counterclockwise. Blades 22 and 23 are shown schematically in end view. Actually it is to be understood that they are adjusted to have the curtate epitrochoid curvature as indicated in Figures 5 and 6. The end view only of blades 22 has been shown eliminating the bulge corresponding to the curvature as seen in Figure 6 in order to simplify the representations in Figure 12.

Position A, at the extreme right of the figure, represents the blades approaching towards the cutting position from the right. The centers of drums 20 and 21 are represented at corresponding points, A, A. The faces 40 and 41 are in off-radial positions with respect to the centers of the drum, as indicated by the extended lines $g$ and $k$ tangent to the base circles R and $R_2$ in a manner already described. At position B the drums have rotated until outermost tip 36 of upper blade 22 just tops the moving web 15 at point $p_0$. This occurs before blade 23 reaches the sheet, due to the projection of blade 22 beyond the pitch circle as described in connection with Figure 11.

At position C the drums have rotated a few degrees more and we note that the forward edge 36 of blade 22 pushes sheet 15 downwardly towards the lower blade 23. Positions A, B and C are "positions before cutting" as indicated in the figure. It is to be understood that the action described in connection with the upper and lower blades proceeds simultaneously and symmetrically from opposite end of sheet 15, due to the symmetrical V arrangement of blades 22 as already described.

In position D we approach the initial instant of shearing between blades 22 and 23 and have reached the angular position corresponding to the "start-of-cut" at point $p_1$ as indicated in the diagram. It will be noted that the forward portion of upper blade 22 has pressed web 15 below its normal horizontal position of movement indicated in dotted at $w$—$w$.

The cutting edges of blades 22 and 23 coact smoothly and without interference. Position E represents the "center-of-cut" where the drums 20 and 21 have rotated to position $h$—$h$ seen in Figure 11, along the cutting angle bisector. In this case, with the base circle of blade 22 equal to R, faces 40 and 41 of the blades are in a "flat-meshing" position. In this position the portions of blades 22 opposite positions 3.25 (half way between 0 and 6.5) are each engaged with the linear blade 23 at the cutting edge 25 thereof. The blade sections from the outer ends 0 up to points 3.25 have already executed their shearing coaction with the lower blade 22. The tapered or V alignment of blades 22 permit the progressive shearing action perpendicularly across web 15, and produces a clean transverse square cut.

The shearing coaction between the blades progresses until position F, representing the "finish-of-cut." This position is represented by point $p_2$ in Figure 11 and corresponds to the instant when central points 6.5 of the blade assembly shown in Figure 5 passes the cutting edge of blade 23 to complete the transverse severance across web 15. It will be noted that the rotation of lower blade 23 has forced sheet 15, previously depressed by blade 22, upwards. The blades coact to maintain the sheet in a rigid position for clear cut shearing action. The dotted sheet 15' at F represents the position of the cut portion thereof just at severance. After being cut, the sheet 15" falls to the position against the peripheral face 45 of lower drum 21.

Position G represents the blades just "after cutting." The cutting edge of blade 23 is still advancing upwardly along the pitch circle ($a$—$a$). The front corner of web 15 is being advanced at the continuous rate heretofore mentioned, moves against the relief 26 hollowed into the face 41 of the blade 22. Thus no interference or destruction of the front edge of the moving web 15 occurs. The cut sheet 15" is shown upon the peripheral surface 45 of the lower drum as shown. The surface 45 in combination with plane face 40 of blade 23 coacts to form a delivery mechanism for sheet 15".

In position H the blades 22 and 23 are just parting as their respective drums rotate. Web 15 has returned to its normal horizontal position corresponding to line $w$—$w$. The cut sheet 15' is delivered in a positive manner to the left to the next machine. Thus the shearing assembly of the present invention has the further advantage of an integral delivery, making it unnecessary to use a separate device for this purpose.

The present invention may be modified in many respects within the broader principle thereof. Thus, the tip of the lower blade corresponding to blade 23 in Figure 11, is shown on the pitch circle in Figure 11. However, the shearing edge of the lower blade may project above or below the pitch line.

Positioning the shearing edge of the lower blade below the pitch circle reduces the off-radial angular position of the blade when designed in accordance with the principles set forth in Figure 11; reduces the angle of shearing; and also reduces the angle of cutting. Accordingly, it is better to have the lower blade reach the pitch circle than have it fall short of it. By projecting the lower blade beyond the pitch circle, several advantages accrue as compared to its design on the pitch circle.

Figure 13:
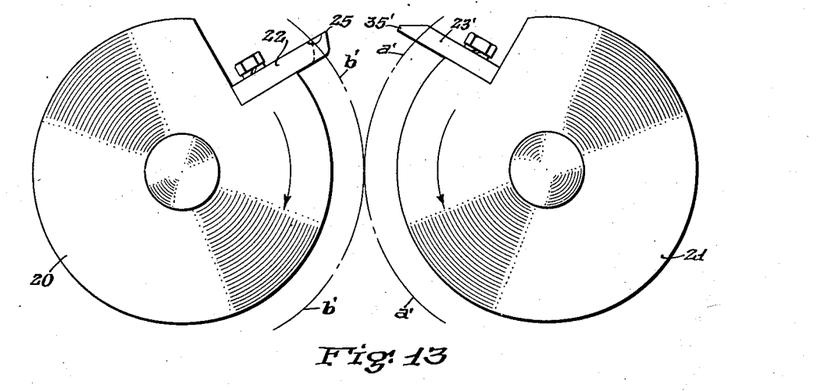
Figure 13 is an end view of a modified form of the invention corresponding to the end view in Figure 11.

Figure 13 is an end view of this latter form of the invention. The upper drum 20 and upper blade 22 are similar to those previously described. The shearing edge 25 of the upper blade projects beyond the upper pitch circle $b'$—$b$. The lower blade 23' is secured to the lower drum 21. The tip 35' of the lower blade 23' projects substantially beyond the lower pitch circle $a'$—$a'$. The design of the curtate epitrochoid with this construction is similar to that already described as will be understood by those skilled in the art. The advantages of the construction of Figure 13, where both blades project beyond the respective pitch circles, are an increase of the off-radial position of the blades; an increased angle of cutting; and better compensation for the tangential circles of the upper blade. Thus, referring to Figure 11, the radius of the circles R and R' approach each other in magnitude simplifying the curvature of the upper blade when the lower blade projects beyond its pitch circle.

Figure 14:
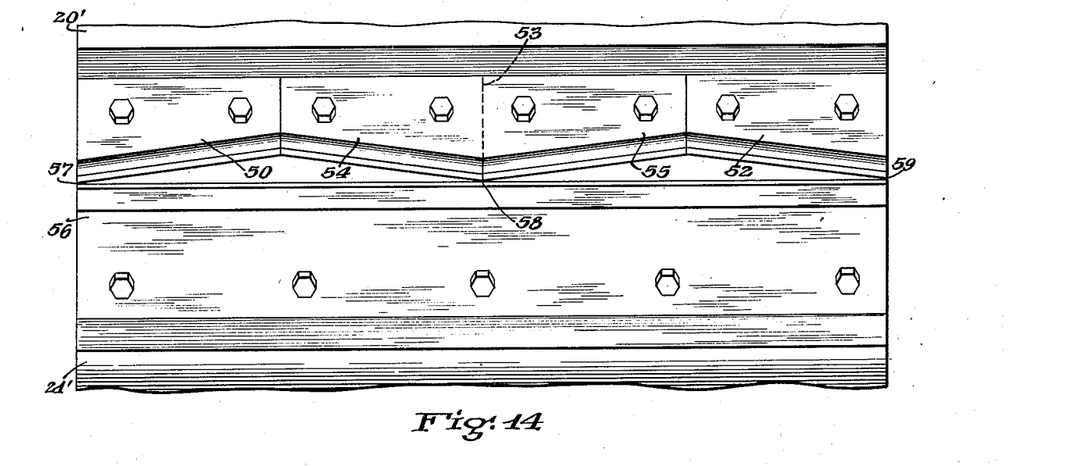
Figure 14 is a further modified form of the invention.

Figure 14 is a modified form of the invention embodying the symmetrical cut. The upper blade is mounted on drum 20'; and the lower blade on drum 21'. The upper blade construction contains a double V arrangement corresponding to a doubling up of the single V construction described heretofore and shown in Figures 1 to 5. The upper blade comprises three sections 50 51 and 52. The upper blade arrangement is symmetrical on either side from the central position indicated by dotted line 53. The left section, constituting the left V comprises element 50 and cooperating left section 54 of the central element 51. The right V section comprises the right portion 55 of element 51 in conjunction with the right plate 52. Each V structure is similar to the individual V structure already described and shown in elevation in Figure 5. The blades are manufactured as plane and flat and have an inherent simple construction. The shearing edges of the blade however are formed into the curtate epitrochoid forms in a manner already described for the single V construction shown hereinabove. Thus the left V construction 50—54 forms an independent "symmetrical cutting unit"; and the right V unit 52—55 also acts as an independent symmetrical cutting unit. Both left and right V units however act simultaneously.

An important advantage of the construction of Figure 14 with the double V blades is that the cutting angle is cut in half for a given shearing angle on the blades. Conversely, the shearing blade angle or length of shearing across a sheet is doubled for a given angle of cut. In the practical case, the angle of shear can well be between 1° and 3° for smooth clean shearing action by the blades.

The lower blade 56 of Figure 14 is a linear blade similar to lower blade 23 of the previous figures. The linear blade 56 cooperates with the double V formation for the symmetrical cutting in a manner similar to the single V operation. The cutting by the double V apparatus of Figure 14 may be started with the three projecting points 57, 58 and 59 of the double V cooperating with blade 56 to shear the paper, or with the middle point 58 lagging behind the end points 57 and 59. The shearing proceeds from outside points 57 and 59 inwardly towards the center and from the central point 58 outwardly in both directions towards the sides. The cutting is a symmetrical action and the sheet is delivered straight in the path of its travel.

Figure 15:
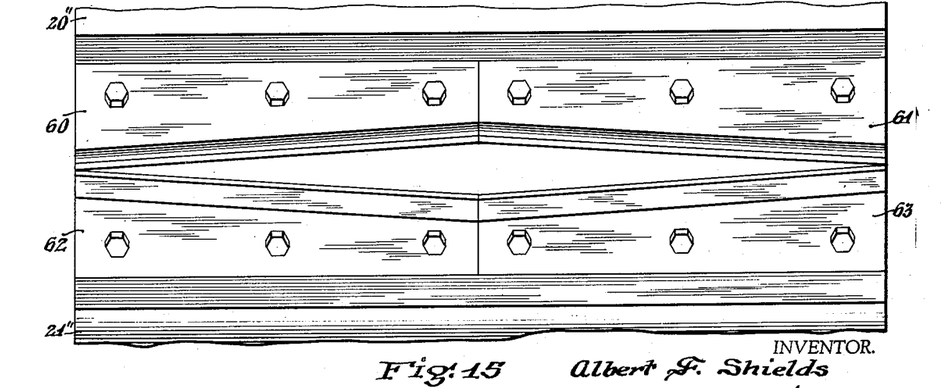
Figure 15 is still a further modification of the present invention.

The invention is not limited to a V construction for the upper blade. The V construction may be imparted to the lower blade structure and the upper blade be linear, which form is a reversed construction as compared to Figure 1. In another form both the upper and the lower blades are formed in a V. Figure 15 is a plan view of such an upper and lower V construction. Upper drum 20" carries the pair of upper blades 60 and 61 arranged in a V. The lower drum 21" carries the lower blades 62 and 63, also arranged in a V, cooperating with the upper V arrangement. The respective blades in Figure 15 are space-curved in the epitrochoid manner as already described in connection with Figure 11.

By forming both the upper and lower blades in the V form, the amount of space curvature form for any one blade is reduced as compared with the form where a single section cooperates with a linear opposite blade.

It is to be understood that the principle of designing the blades of the modifications in Figures 13, 14 and 15 are similar to those described in the design of the single V form in Figures 1 to 12. The curtate epitrochoid principle is used, in conjunction with the design of the base circles and the off-radial positions of the upper and lower blades on their respective drums. The actual cutting angle and the degree of space curvature of the individual blades depends upon the length of the blades, the position of the shearing edges with respect to the pitch circles thereof and the respective design of the cooperating blades as will now be evident. Modifications of the disclosed embodiments are feasible and will be evident to those skilled in the art. However, I do not intend to be limited except as set forth in the following claims.

I claim:

1. A shearing mechanism for a continuously moving web comprising a pair of rotating knife blades mounted on respective opposed rotary elements and rotating about a fixed center one of said knives having its shearing edge tapered inwardly from the outer sides into a V formation along a direction transverse to the web.

2. A shearing mechanism for a continuously moving web comprising a pair of rotating knife blades mounted on respective opposed rotary elements and rotating about a fixed center, one of said knives having its shearing edge tapered inwardly from the outer sides narrowing into a V formation along a direction transverse to the web, both halves of said V-shaped knife being symmetrical about the center thereof whereby a symmetrical cutting action is produced by the knives on the web for firmly holding the sheet during shearing and straight delivery thereof after cutting.

3. A rotary shearing mechanism for a continuously moving web comprising a pair of knives mounted on respective opposed rotary elements, one of said knives having its shearing edge tapered inwardly from the outer sides into a V formation along a direction transverse to the web, each half of said V-shaped knife edge being symmetrical about the center thereof, and curved slightly in both radial and axial directions.

4. A rotary shearing mechanism for a contiuously moving web comprising a pair of knives mounted on respective opposed rotary elements, one of said knives having its shearing edge tapered inwardly from the outer sides narrowing into a V formation along a direction transverse to the web, both halves of said V-shaped knife being symmetrical about the center thereof whereby a symmetrical cutting action is produced by the knives on the web for firmly holding the sheet during shearing and straight delivery thereof after cutting, said V-tapered knife edge being curved so that its projection in a radial plane forms a curtate epitrochoid.

5. A rotary shearing mechanism for a continuously moving web comprising a pair of knives mounted on respective opposed rotary elements, one of said knives having its shearing edge tapered inwardly from the outer sides into a V formation along a direction transverse to the web, both halves of said V-shaped knife being symmetrical about the center thereof, said knife edge being so curved transversely that its projection in a radial plane is trochoidal in character for each half of the V blade portion, adjacent blade portions being symmetrical in their space curvature with respect to each other.

6. A rotary shearing mechanism for a continuously moving web comprising a pair of knives mounted on respective opposed rotary elements, one of said knives having its shearing edge tapered inwardly from the outer sides narrowing into a V formation along a direction transverse to the web, both halves of said V-shaped knife being symmetrical about the center thereof whereby a symmetrical cutting action is produced by the knives on the web for firmly holding the sheet during shearing and straight delivery thereof after cutting, said V-tapered knife edge being so shaped that its curvature in the axial direction is trochoidal in character for each half of the V blade portion, adjacent blade portions being symmetrical in this space curvature with respect to each other, the shearing edge of said space-curved knife projecting beyond the associated pitch circle of the unit.

7. A shearing mechanism for a continuously moving web comprising a pair of rotating flat knives mounted on respective opposed rotary elements and rotating about a fixed center, one of said knives having its shearing edge tapered inwardly from the outer sides narrowing into a formation along a direction transverse to the web, both halves of said V-shaped knife being symmetrical about the center thereof, the face of the tapered knife being positioned in an off-radial plane on its rotary element.

8. A shearing mechanism for a continuously moving web comprising a pair of rotating knives mounted on respective opposed rotary elements, one of said knives having its shearing edge tapered from the outer sides into a double V formation along a direction transverse to the web, both halves of said double V-shaped knife being symmetrical about the center thereof whereby a symmetrical cutting action is produced by the knives on the web for firmly holding the sheet during shearing and straight delivery thereof after cutting.

9. A rotary shearing mechanism for a continuously moving web comprising a pair of flat knives mounted on respective opposed rotary elements, one of said knives having its shearing edge tapered from the outer sides into a double-V formation along a direction transverse to the web, both halves of said double-V shaped knife being symmetrical about the center thereof, said double-V tapered knife edge being so curved along the direction transverse to the web that its projection on a radial plane forms a curtate epitrochoid for each quarter of the double-V blade portion.

10. A rotary shearing mechanism for a continuously moving web comprising a pair of knives mounted on respective opposed rotary elements, one of said knives having its shearing edge tapered inwardly from the outer sides narrowing into a V formation along a direction transverse to the web, both halves of said V-shaped knife being symmetrical about the center thereof whereby a symmetrical cutting action is produced by the knives on the web for firmly holding the sheet during shearing and straight delivery thereof after cutting, said V-tapered knife edge being so curved as to form a curtate epitrochoid, in the radial direction, the opposite coacting knife having a linear shearing edge substantially parallel to its rotary axis and having its face positioned in an off-radial plane with respect to its rotary element axis.

11. A rotary shearing mechanism for a continuously moving web comprising a pair of knives mounted on respective opposed rotary elements, one of said knives having its shearing edge tapered inwardly from the outer sides narrowing into a V formation along a direction transverse to the web, both halves of said V-shaped knife being symmetrical about the center thereof whereby a symmetrical cutting action is produced by the knives on the web for firmly holding the sheet during shearing and straight delivery thereof after cutting, said V-tapered knife edge being so curved as to form a curtate epitrochoid when projected on a radial plane for each half of the V blade portion, adjacent blade portions being symmetrical in this space curvature with respect to each other, the shearing edge of said space-curved knife projecting beyond the associated pitch circle of the unit, the opposite coacting knife having a linear shearing edge substantially parallel to its rotary axis and having its face positioned in an off-radial plane with respect to its rotary element axis and projecting beyond the associated pitch circle thereof.

12. A rotary shearing mechanism for a continuously moving web comprising a pair of knives mounted on respective opposed rotary elements, one of said knives having its shearing edge tapered inwardly from the outer sides into a V formation along a direction transverse to the web, both halves of said V-shaped knife being symmetrical about the center thereof, said V-tapered knife edge being curved along the direction transverse to the web, the shearing edge of the coacting knife also being tapered inwardly from the outer sides into a V formation.

13. A shearing mechanism for a continuously moving web comprising a pair of rotating knives mounted on respective opposed rotary elements and rotating about a fixed center, one of said knives having its shearing edge tapered inwardly from the outer sides into a V formation along a direction transverse to the web, the shearing edge of the coacting knife also being tapered inwardly from the outer sides into a V formation, said knives being adjusted in off-radial positions for producing a coplanar relation of the respective knife faces at substantially the middle of the cutting interval of the knives, the said knives being angularly disposed with respect to each other at other portions of the cutting interval.

14. A shearing mechanism for a continuously moving web comprising a pair of rotating knives mounted on respective opposed rotary drums, one of said knives having its shearing edge tapered inwardly from the outer sides narrowing into a V formation along a direction transverse to the web, both halves of said V-shaped knife being symmetrical about the center thereof, the face of the tapered knife being positioned in an off-radial plane on its rotary drum, the opposite coacting knife having its face positioned in an off-radial plane with respect to its rotary drum axis, said knives being adjusted in their off-radial positions for producing a coplandar relation of the respective knife faces at substantially the middle of the cutting interval of the knives.

15. A rotary shearing mechanism for a continuously moving web comprising a pair of rotating knives mounted on respective opposed rotary drums, the upper one of said knives having its shearing edge tapered inwardly from the outer sides narrowing into a V formation along a direction transverse to the web, both halves of said V-shaped knife being symmetrical about the center thereof, said V-tapered knife being curved along the direction transverse to the web whereby a symmetrical cutting action is produced by the knives on the web for firmly holding the sheet during shearing and straight delivery thereof after cutting, the peripheral surface of the under drum reaching near the shearing region of the associated knife for supporting the sheets after cutting and coacting with the adjacent face of the knife to form a delivery device for the sheets.

16. A rotary shearing mechanism for a continuously moving web comprising a pair of knives mounted on respective opposed rotary elements, one of said knives having its shearing edge tapered inwardly from the outer sides into a V formation along a direction transverse to the web, both halves of said V-shaped knife being symmetrical about the center thereof, said V-tapered knife edge being curved along the direction transverse to the web to form a curtate epitrochoid in the radial direction for each half of the V blade portion, adjacent blade portions being symmetrical in this space curvature with respect to each other, the shearing edge of the coacting knife also being tapered inwardly from the outer sides into a V formation and curved substantially into a curtate epitrochoid when projected on a radial plane whereby a symmetrical cutting action is produced by the knives on the web for firmly holding the sheet during shearing and straight delivery thereof after cutting.

17. A shearing mechanism for a continuously moving web comprising a pair of rotating knife blades mounted on respective opposed rotary elements, the faces of the blades continually changing their angle with respect to each other during rotation, one of said knives having its shearing edge tapered inwardly from the outer sides into a V formation along a direction transverse to the web.

18. A shearing mechanism for a continuously moving web comprising a pair of rotating knife blades mounted on respective opposed rotary elements, the edges of said blades coacting with each other during the shearing operation, the angles between the faces of said blades, continually changing during said shearing operation, one of said knives having its shearing edge tapered inwardly from the outer sides into a V formation along a direction transverse to the web.

19. A shearing mechanism for a continuously moving web comprising a pair of rotating knife blades mounted on respective opposed rotary elements, the edge of each knife blade describing a circle about the center of rotation of its associated rotary element, one of said knives having its shearing edge tapered inwardly from the outersides into a V formation along a direction transverse to the web.

20. A shearing mechanism for a continuously moving web comprising a pair of rotating knife blades mounted on respective opposed rotary elements, the faces of the blades when said blades are meshing continually changing their angle with respect to each other, one of said knives having its shearing edge tapered inwardly from the outer sides into a V formation along a direction transverse to the web.

21. A rotary shearing mechanism for a continuously moving web comprising a pair of knives mounted on respective opposed rotary elements, one of said knives having its shearing edge tapered inwardly from the outer sides into a V formation along a direction transverse to the web, each half of said V-shaped knife edge being symmetrical about the center thereof, one of said knives being curved slightly in both radial and axial directions.

22. A shearing mechanism for a continuously moving web comprising a pair of rotating knife blades mounted on respective opposed rotary elements, the face of one of the blades forming an angle with the face of the other of the blades during the shearing operation, said angle continually changing during the shearing operation, one of said knives having its shearing edge tapered inwardly from the outer sides into a V formation along a direction transverse to the web.

23. A shearing mechanism for a continuously moving web comprising a pair of rotating knife blades mounted on respective opposed rotary elements, the edge of each knife blade describing a circle about a fixed center, one of said knives having its shearing edge tapered inwardly from the outer sides into a V formation along a direction transverse to the web.

ALBERT F. SHIELDS.